United States Patent
Ramachandran et al.

(10) Patent No.: US 11,303,523 B2
(45) Date of Patent: Apr. 12, 2022

(54) CLOUD-BASED SERVICE POLICY REROUTE

(71) Applicant: Microsoft Technology Licensing, LLC, Redmond, WA (US)

(72) Inventors: Prasanna Ramachandran, Bellevue, WA (US); Raja Charu Vikram Kakumani, Redmond, WA (US); Brandon Brian Murdoch, Henley-on-Thames (GB); Muhammad Omer Iqbal, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 132 days.

(21) Appl. No.: 16/213,686

(22) Filed: Dec. 7, 2018

(65) Prior Publication Data

US 2020/0099587 A1 Mar. 26, 2020

Related U.S. Application Data

(60) Provisional application No. 62/735,549, filed on Sep. 24, 2018.

(51) Int. Cl.
*H04L 12/24* (2006.01)
*H04L 29/08* (2006.01)
(Continued)

(52) U.S. Cl.
CPC ...... *H04L 41/0893* (2013.01); *H04L 41/0859* (2013.01); *H04L 41/5054* (2013.01); *H04L 67/32* (2013.01); *H04L 67/34* (2013.01)

(58) Field of Classification Search
CPC ............ H04L 41/0893; H04L 41/0859; H04L 41/5054; H04L 67/32; H04L 67/34
(Continued)

(56) References Cited

U.S. PATENT DOCUMENTS 7,043,659 B1 * 5/2006 Klein .................. H04L 41/0631
714/26
8,326,315 B2 * 12/2012 Phillips .............. G08B 21/0269
455/456.1

(Continued)

FOREIGN PATENT DOCUMENTS

EP 2924561 A2 9/2015

OTHER PUBLICATIONS

"International Search Report and Written Opinion Issued in PCT Application No. PCT/US19/039668", dated Sep. 20, 2019, 11 Pages.

*Primary Examiner* — David P Zarka
(74) *Attorney, Agent, or Firm* — Mannava & Kang, P.C.

(57) ABSTRACT

According to examples, an apparatus may include a processor and a memory on which is stored machine readable instructions. The instructions may cause the processor to receive a call request for a cloud-based service and retrieve a first policy corresponding to the cloud-based service, the first policy identifying a policy reroute. The instructions may also cause the processor to determine which second policy of a plurality of second policies that corresponds to the policy reroute and retrieve the second policy that the corresponds to the policy reroute. The instructions may further cause the processor to apply the second policy on the cloud-based service and respond to the call request following the application of the second policy.

18 Claims, 4 Drawing Sheets

(51) Int. Cl.
*H04L 41/0893* (2022.01)
*H04L 41/5054* (2022.01)
*H04L 67/60* (2022.01)
*H04L 67/00* (2022.01)
*H04L 41/0859* (2022.01)

(58) Field of Classification Search
USPC .................................................... 709/220
See application file for complete search history.

(56) References Cited

U.S. PATENT DOCUMENTS

| | | | | |
|---|---|---|---|---|
| 8,750,895 | B2* | 6/2014 | Grosman | H04W 4/021 |
| | | | | 455/456.1 |
| 8,850,026 | B2* | 9/2014 | Glover | H04L 47/781 |
| | | | | 709/226 |
| 9,424,431 | B2* | 8/2016 | Anderson | G06F 21/575 |
| 9,461,920 | B2* | 10/2016 | Centoza | H04W 28/08 |
| 9,705,802 | B2* | 7/2017 | Koo | G06Q 20/384 |
| 9,848,330 | B2* | 12/2017 | Kaufman | H04W 4/50 |
| 9,942,273 | B2* | 4/2018 | Lee | G06F 16/86 |
| 10,334,396 | B2* | 6/2019 | Lyman | H04W 4/50 |
| 10,372,923 | B2* | 8/2019 | Myers | G06F 21/81 |
| 10,382,321 | B1* | 8/2019 | Boyapati | H04L 45/745 |
| 10,637,731 | B2* | 4/2020 | McNab | G05B 19/042 |
| 2005/0190909 | A1* | 9/2005 | Yoneyama | H04L 47/10 |
| | | | | 379/356.01 |
| 2014/0033212 | A1 | 1/2014 | Balasubramaniam et al. | |
| 2014/0053280 | A1 | 2/2014 | Durazzo et al. | |
| 2015/0215832 | A1* | 7/2015 | Fitzpatrick | H04W 36/00837 |
| | | | | 455/426.1 |
| 2015/0365291 | A1* | 12/2015 | Burton | H04L 47/70 |
| | | | | 709/226 |
| 2016/0127418 | A1 | 5/2016 | Maes et al. | |
| 2016/0246624 | A1* | 8/2016 | Vernia | G06F 9/45558 |
| 2016/0344738 | A1* | 11/2016 | Dotan | H04L 63/0263 |
| 2017/0339070 | A1 | 11/2017 | Chang et al. | |
| 2019/0332440 | A1* | 10/2019 | Smaldone | H04L 43/0876 |
| 2020/0036590 | A1* | 1/2020 | Camarillo Gonzalez | |
| | | | | H04W 64/003 |

\* cited by examiner

CLOUD-BASED SERVICE POLICY REROUTE

CLAIM FOR PRIORITY

This application claims the benefit of priority to U.S. Provisional Application Ser. No. 62/735,549 having the title "CLOUD-BASED SERVICE POLICY REROUTE" and filed on Sep. 24, 2018, the disclosure of which is hereby incorporated by reference in its entirety.

BACKGROUND

Cloud-based services may generally refer to the delivery of computing resources, data storage, and other information technology (IT) services via a network infrastructure, such as the Internet. A network of computing resources, data storage, and IT services of cloud-based service providers may provide the cloud-based services to users such as tenants and customers. For example, owners, lessees, or outside users of the cloud-based services may utilize the cloud-based services to obtain the benefit of large computational and/or storage resources provided by the cloud-based service providers.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
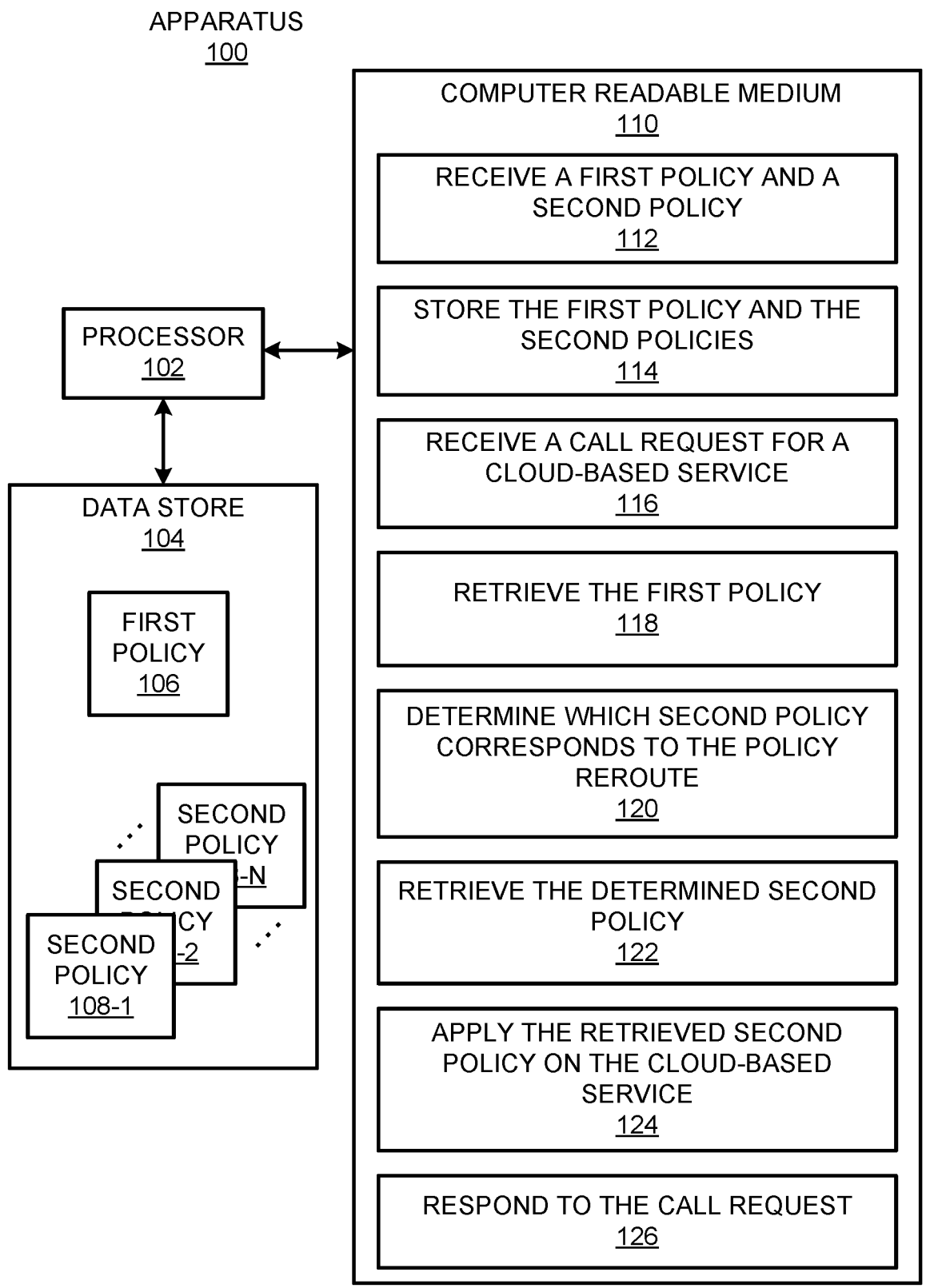
FIG. 1 depicts a block diagram of an apparatus that may apply a policy reroute on a cloud-based service in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

A cloud-based service provider may execute specific code to provide a cloud-based service to users based on user attributes. In some examples, the cloud-based service provider may provide the cloud-based service for a tenant of the cloud-based service provider with which the cloud-based service provider may have entered into an agreement to provide the cloud-based service with certain features, e.g., background colors, sign-in requirements, web page contents, etc. The certain features may be defined in the specific code such that execution of the specific code may cause the cloud-based service to be provided according to the certain features. As the tenant may be a separate entity, e.g., individual, business, corporation, etc., from the cloud-based service provider, the cloud-based provider may not afford the tenant with access or rights to access the certain code. As a result, the tenant may not be able to modify the specific code of the cloud-based service. Instead, the tenant may be required to submit a request for the cloud-based service provider to modify the certain code and the cloud-based service provider may modify the certain code to comply with the request. As the tenant may not be able to modify the certain code, the modification of the certain code may be time-consuming, labor-intensive, resource-intensive, and may cause a disruption to the cloud-based service while the certain code is being modified. In some instances, the tenant may not even be permitted to submit changes to the certain code as those changes may affect behavior for other tenants.

Disclosed herein are apparatuses, methods, and computer readable mediums that may enable a tenant to modify cloud-based services during runtime of the cloud-based services. Particularly, for instance, a cloud-based service provider may execute a cloud-based service through a combination of deployed code and config files associated with the cloud-based service. The config files may be or may include policies that a tenant may define and submit to the cloud-based service provider, in which the policies may define a feature, an execution plan, an attribute, etc., of the cloud-based service. In some examples, a policy may be a certain background color of the tenant's website, a certain background color of the tenant's account on a social networking website, a first customer sign in page, a second customer sign in page, an identification of a machine (or node) that is to execute the cloud-based service, a version of the cloud-based service that a machine is to execute, and/or the like.

Some of the policies may also identify multiple reroute policies of a first policy. For instance, the first policy may identify one of the reroute policies, e.g., a next or subsequent policy, that the cloud-based service provider may apply following parsing of the first policy. In these examples, a tenant may have submitted multiple second policies, in which certain ones of the second policies may be applied depending upon a certain condition being satisfied and/or may be applied arbitrarily. That is, for instance, when a first condition occurs, a first policy reroute may be identified in the first policy and when a second condition occurs, a second policy reroute may be identified in the first policy. The condition may include, for instance, an identification of a deployment unit of the cloud-based service provider, percentages of deployment units of the cloud-based service provider that are to execute different versions of a policy, percentage of deployment units that may denote the probability with which a specific second policy is chosen when the choice is specified to be made arbitrarily, a geographic location of a customer seeking access to the cloud-based service, a match with a predefined URL, or the like.

According to examples, the config files may be employed for safe deployment of new or updated versions of a cloud-based service. For instance, the config files may define policies that may cause an updated version and/or an updated feature of the cloud-based service to initially be executed on a relatively small number of deployment units and to gradually increase the number of deployments over time. In addition, or in other examples, the config files may define policies that may enable A/B testing to be performed on the updated version and/or the updated feature of the cloud-based service. That is, for instance, the config files may define policies that may route a portion of traffic to a new execution flow while a majority of the traffic is routed to an existing execution flow. The config files may be tenant specific config files and thus, there may be a large number of config files as defined by a tenant.

As further examples, the config files may alter an execution flow of the cloud-based service based on where the traffic originates, e.g., the execution flow may be altered based on a user's geographic location, type of user device, or the like. As still further examples, the config files may alter execution flows for special cases, which may occur when requests for an execution flow originates from special actors, such as users participating in a experimentation system. For instance, the config files may determine whether a URL in a call request for a cloud-based service matches a specific URL associated with the experimentation system and may reroute to a policy corresponding to the experimentation system.

A technical problem associated with the deployment of modifications, such as updates and/or upgrades, to cloud-based services may be that such deployment may be cumbersome, may consume a great deal of computing resources, and may be prone to unsafe deployment practices. Through implementation of the policy rerouting corresponding to a cloud-based service as defined in tenant config files as disclosed herein, modifications to the cloud-based service may be deployed in a safe manner, e.g., gradually over increasing numbers of deployment units. In addition or in other examples, the policy rerouting as disclosed herein may enable for A/B testing as well as altering execution based on pivots.

By safely deploying modifications to the cloud-based service as disclosed herein, the deployment may be made while reducing or minimizing consumption of computing resources. That is, for instance, when a deployment is made in an unsafe manner and an error occurs, the error may occur on each of the machines on which the deployment has been made. As the deployment may have been made across all of the machines that execute code to provide a cloud-based service, the error may result in all of the machines being shut down or otherwise requiring service, which may also result in the machines being operated inefficiently. In contrast, by gradually deploying the modifications over time as may be enabled through implementation of the apparatuses, methods, and computer readable mediums disclosed herein, the number of machines on which errors caused by the deployment of the modification may be limited, and thus, the disruption to the cloud-based service may also be limited. A technical solution to the technical problem discussed above may thus be that features of the present disclosure may reduce the inefficient operation of machines, e.g., servers of a cloud-based service provider, caused by errors in the deployment of modifications to cloud-based services.

Figure 2:
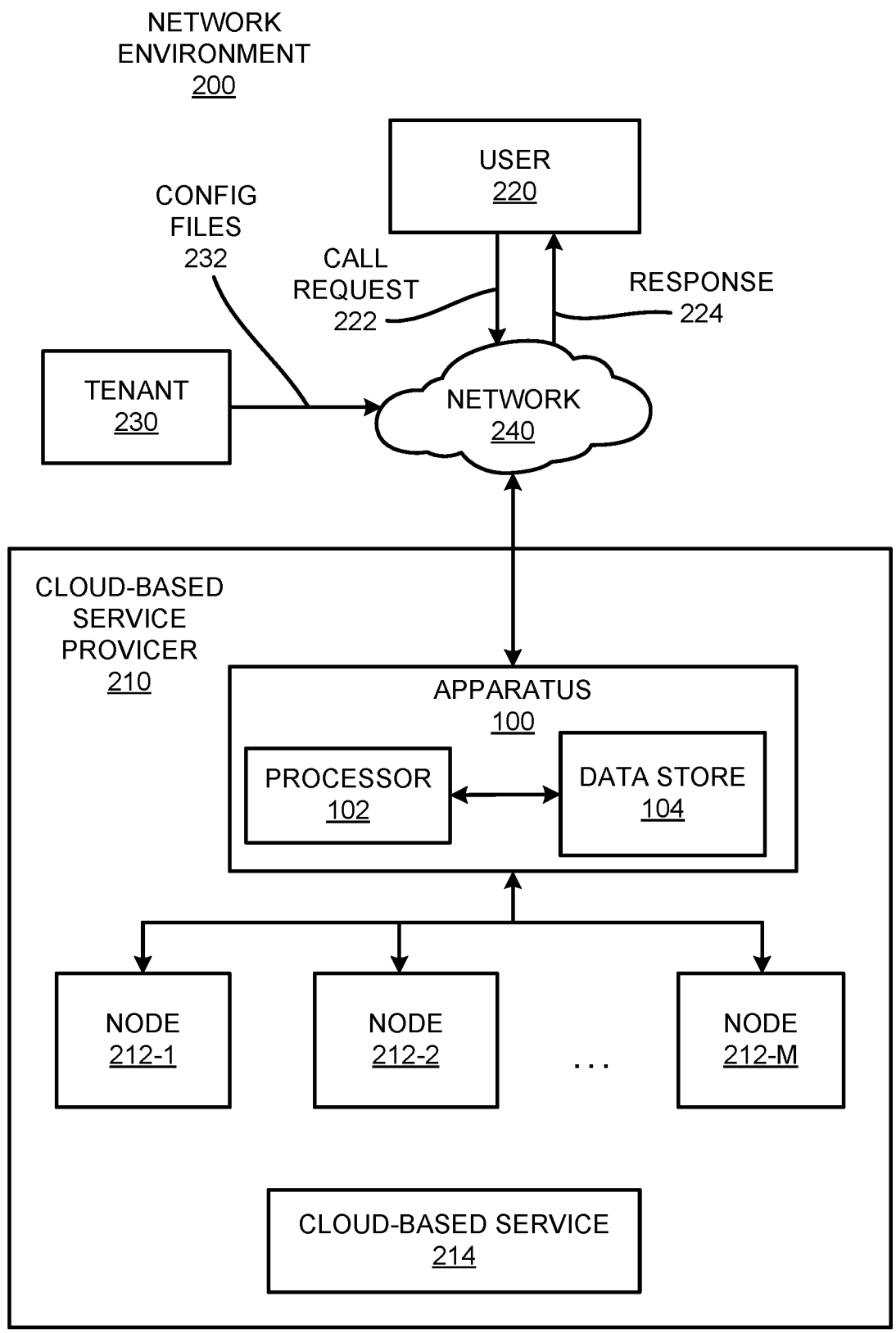
FIG. 2 depicts a block diagram of a network environment in which the apparatus depicted in FIG. 1 may be implemented to apply a policy reroute on a cloud-based service in accordance with an embodiment of the present disclosure.

Reference is first made to FIG. 1 and FIG. 2. FIG. 1 shows a block diagram of an apparatus 100 that may apply a policy reroute on a cloud-based service in accordance with an embodiment of the present disclosure. FIG. 2 shows a block diagram of a network environment 200 in which the apparatus 100 depicted in FIG. 1 may be implemented to apply a policy reroute on a cloud-based service in accordance with an embodiment of the present disclosure. It should be understood that the apparatus 100 depicted in FIG. 1 and/or the network environment 200 depicted in FIG. 2 may include additional features and that some of the features described herein may be removed and/or modified without departing from the scope of the apparatus 100 and/or the network environment 200.

The apparatus 100 may be a server, a node in a network (such as a data center), a computing device, a laptop computer, and/or the like. The apparatus 100 may include a processor 102 and a computer readable medium 110. The processor 102 may be a semiconductor-based microprocessor, a central processing unit (CPU), an application specific integrated circuit (ASIC), a field-programmable gate array (FPGA), and/or other hardware device. Although the apparatus 100 is depicted as having a single processor 102, it should be understood that the apparatus 100 may include additional processors and/or cores without departing from a scope of the apparatus 100. In this regard, references to a single processor 102 as well as to a single machine readable medium 110 may be understood to additionally or alternatively pertain to multiple processors 102 and multiple computer readable mediums 110.

As shown in FIG. 2, the apparatus 100 may be part of a cloud-based service provider 210. The cloud-based service provider 210 may be an organization, company, etc., that may provide cloud-based services 214 to users 220, e.g., the cloud-based service provider 210 may include a data center. The cloud-based services 214 may include, for instance, websites, cloud-based applications, cloud-based storage, and/or the like. The cloud-based service provider 210 may also include a plurality of nodes 212-1 to 212-M, in which the variable "M" may represent a value greater than one. The nodes 212-1 to 212-M may be machines, e.g., servers, storage devices, CPUs, or the like, and may include respective processors and computer readable mediums (not shown). The apparatus 100 may also be a node in the cloud-based service provider 210 and each of the nodes 212-1 to 212-M may have a similar configuration and may have similar instructions as the apparatus 100.

In any regard, each or a plurality of the nodes 212-1 to 212-M, which may include the apparatus 100, may execute code and/or config files to provide a cloud-based service 214. That is, multiple nodes 212-1 to 212-M may execute the code and/or the config files to provide the same cloud-based service to users 220. As discussed in detail herein, different ones of the nodes 212-1 to 212-M may execute different config files that may correspond to different versions of the cloud-based service 214 and/or may define different features of the cloud-based service 214. The cloud-based service 214 is thus shown in FIG. 2 as being provided by the cloud-based service provider 210 without the cloud-based service 214 being tied to any particular node 212-1 to 212-M.

The computer readable medium 110 may be, for example, Random Access memory (RAM), an Electrically Erasable Programmable Read-Only Memory (EEPROM), a storage device, an optical disc, or the like. The computer readable medium 110, which may also be referred to as a machine readable storage medium, may be a non-transitory computer readable storage medium, where the term "non-transitory"

does not encompass transitory propagating signals. In any regard, the computer readable medium 110 may have stored thereon machine readable instructions 112-126. It should be understood that each of the nodes 212-1 to 212-M may include a processor 102 and the computer readable medium 110 with the machine readable instructions 112-126. As such, for instance, each of the apparatus 100 and the nodes 212-1 to 212-M may execute the instructions 112-126 individually or collectively.

The processor 102 may fetch, decode, and execute the instructions 112 to receive a first policy 106 and a second policy 108-1. That is, for instance, the processor 102 may receive a second policy 108-1 of a plurality of possible second policies 108-1 to 108-N, in which the variable "N" may represent a value greater than one. In addition, the processor 102 may fetch, decode, and execute the instructions 114 to store the first policy 106 and a plurality of second policies 108-1 to 108-N in a data store 104. The data store 104 may be, for example, Random Access memory (RAM), an Electrically Erasable Programmable Read-Only Memory (EEPROM), a storage device, an optical disc, or the like. In some examples, the data store 104 may be part of the computer readable medium 110 or the computer readable medium 110 may be part of the data store 104.

The first policy 106 may be a first config file and the plurality of second policies 108-1 to 108-N may be a plurality of second config files. In other words, the first policy 106 may be defined in a first config file and the plurality of second policies 108-1 to 108-N may be defined in a plurality of second config files. In any regard, a tenant 230 may generate the first config file and the second config files and may upload or submit the first config file and the second config files, collectively referenced herein as config files 232, to the cloud-based service provider 210 via a network 240, which may be the Internet, an intranet, or the like.

According to examples, the first policy 106 may identify a policy reroute to one or more of the second policies 108-1 to 108-N in any of the manners discussed herein. In addition, the second policies 108-1 to 108-N may each correspond to, for instance, different variations of a feature (e.g., a background color, a popup display, a sign-in page, etc.) of the cloud-based service 214, different versions of the cloud-based service 214, different execution plans for the cloud-based service 214, different pivots associated with the cloud-based service 214 (e.g., based on attributes of a user), different versions of the cloud-based service 214 based on URLs of call requests, or the like.

The processor 102 may fetch, decode, and execute the instructions 116 to receive a call request 222 for a cloud-based service 214 via the network 240. The user 220 may submit the call request for the cloud-based service 214 by, for instance, by entering a URL or selecting a hyperlink corresponding to the cloud-based service 214 into a web browser, by visiting a website corresponding to the cloud-based service 214, by starting an application corresponding to the cloud-based service 214, or the like.

The processor 102 may fetch, decode, and execute the instructions 118 to retrieve, based on the received call request 222, a first policy 106 corresponding to the cloud-based service 214. That is, for instance, the processor 102 may determine that the call request 222 may be for a particular cloud-based service 214 and may also determine that the first policy 106 corresponds to the cloud-based service 214. In addition, the first policy 106 may be a first config file that a tenant 230 of the cloud-based service 214 may have defined to modify a functionality of the cloud-based service 214, e.g., user OS, or the like. As part of the modification of the functionality, the first policy 106 may identify a policy reroute that is to be applied for the cloud-based service 214. The policy reroute may be an identification of another policy to which the processor 102 is to be routed from the first policy 106.

In some examples, the first policy 106 may identify which of the second policies 108-1 to 108-N to which the processor 102 is to be rerouted based on various pivots, e.g., factors or conditions. For instance, the first policy 106 may identify the policy reroute based on an attribute of the user 220, in which the attribute of the user 220 may be a geographic location of the user 220, an OS of a device through which the user 220 accesses the cloud-based service 214, and/or the like. By way of example in which the condition of the rerouting is the geographic location of the user 220, the processor 102 may determine that the user 220 is in a first geographic location and based on that determination, may identify a particular one of the second policies 108-1 corresponding to that condition. In addition, the processor 102 may determine that the user 220 is in a second geographic location and based on that determination, may identify a different one of the second policies 108-2 corresponding to that condition. By way of particular example in which the second policies 108-1 and 108-2 define background colors of a webpage provided by the cloud-based service 214, one of the second policies 108-1 may pertain to one color and another one of the second policies 108-2 may pertain to another color.

In some examples, the first policy 106 may arbitrarily or randomly identify which of the second policies 108-1 to 108-N to which the processor 102 is to be rerouted. For instance, the first policy 106 may select one of the second policies 108-1 to 108-N randomly as call requests 222 are received. In addition, or alternatively, the processor 102 may employ a different selection strategy, such as round-robin selection, selection based on identifications of the second policies 108-1 to 108-N, etc. In the examples above, the second policies 108-1 to 108-N may be construed as candidate policy reroutes of the first policy 106 and the processor 102 may select or identify one or more of the second policies 108-1 to 108-N as the policy reroute of the first policy.

In some examples, each of the second policies 108-1 to 108-N may define one of a plurality of different variations of a feature of the cloud-based service 214. The feature of the cloud-based service 214 may be, for instance, a background color, a color scheme, a sign-in requirement, a pop-up message, or the like. According to examples, the first policy 106 may identify which of the second policies 108-1 to 108-N is to respectively correspond to the policy reroute for a particular call request 222, for instance, in the manners discussed above.

In some examples, each of the second policies 108-1 to 108-N may define one of a plurality of different versions of the cloud-based service 214. For instance, one of the second policies 108-1 may define a first version of the cloud-based service 214, another one of the second policies 108-2 may define a second version of the cloud-based service 214, etc. The versions of the cloud-based service 214 may include, for instance, a current version and a new or updated version of the cloud-based service 214. By way of particular example, the tenant 230 may define the first policy 106 such that a certain percentage of the call requests 222 are directed to the current version, e.g., directed to nodes 212-1 to 212-M that may execute a first one of the second policies 108-1 that corresponds to the current version of the cloud-based service 214. Likewise, the tenant 230 may define the first policy 106 such that another certain percentage of the call requests 222 are directed to the new version, e.g., directed to nodes 212-1 to 212-M that may execute another one of the second policies 108-2 that corresponds to the new version of the cloud-based service 214.

In one regard, the first policy 106 may be defined to safely deploy application of the new version of the cloud-based service 214 by initially deploying the application of the new version onto a small number of nodes 212-1 to 212-M. The first policy 106 may also be defined to gradually increase the number of nodes 212-1 to 212-M on which application of the new version of the cloud-based service 214 is deployed following the initial deployment to thus safely deploy the new version. The first policy 106 may further be defined to split the nodes 212-1 to 212-M on which application of the new version and the current version may be deployed for A/B testing of the cloud-based service 214. In addition or alternatively to the number of nodes 212-1 to 212-M, the first policy 106 may be defined to deploy application of different versions of the cloud-based service 214 based on identifications of the nodes 212-1 to 212-M. That is, for instance, the second policies 108-1 to 108-N may include a parameter that identifies the nodes 212-1 to 212-M that are to deploy application of the new version of the cloud-based service 214.

In some examples, each of the second policies 108-1 to 108-N may define one of a plurality of execution plans for the cloud-based service 214. The execution plans may include, for instance, a first percentage or a first number of instances in which a first one of the second policies 108-1 is to be the policy reroute of the first policy 106, a second percentage or a second number of instances in which a second one of the second policies 108-2 is to be the policy reroute of the first policy 106, etc. By way of particular example in which the first one of the second policies 108-1 defines a first sign in display and the second one of the second policies 108-2 defines a second sign in display, the first policy 106 may define that the first one of the second policies 108-1 is to be applied for 90% of the call requests 222 and that the second one of the second policies 108-2 is to be applied for 10% of the call requests 222.

In some examples, the first policy 106 may identify the policy reroute based on a URL included in the call request 222. For instance, each of the second policies 108-1 to 108-N may correspond to one of a plurality of different URLs and the processor 102 may determine the URL in the call request 222 and based on the determined URL, identify the policy reroute to correspond to the second policy 108-1 associated with the determined URL. By way of example, the URL included in the call request 222 may be a predefined URL that is to trigger application of a particular version of the cloud-based service 214.

The processor 102 may fetch, decode, and execute the instructions 120 to determine which second policy 108-1 to 108-N corresponds to the policy reroute identified in the first policy 106. For instance, the processor 102 may identify the policy reroute of the first policy 106 and the corresponding second policy 108-1 in any of the manners discussed above.

The processor 102 may fetch, decode, and execute the instructions 122 to retrieve the second policy 108-1 that is determined to correspond to the policy reroute of the first policy 106. The processor 102 may retrieve the second policy 108-1 from the data store 104.

The processor 102 may fetch, decode, and execute the instructions 124 to apply the retrieved second policy 108-1 on the cloud-based service 214. That is, for instance, the processor 102 may apply the retrieved second policy 108-1 to vary a color of webpage provided by the cloud-based service 214, to control a version of the cloud-based service 214 to be provided, to deploy a version of the cloud-based service 214 on a particular node 212-1, or the like. Based on the application of the retrieved second policy 108-1 on the cloud-based service 214, the cloud-based service 214 may generate various outputs, e.g., webpages having various attributes, applications having various attributes, etc.

The processor 102 may fetch, decode, and execute the instructions 126 to respond 224 to the call request 222 following application of the second policy 108-1 on the cloud-based service 214. That is, for instance, the processor 102 may provide the user 220 with a the cloud-based service 214 that may have been modified through application of the second policy 108-1. As discussed herein, in some examples, the selection of the second policy 108-1 to 108-N may be based on an attribute of the user 220 and thus, different users 220 may be provided with different responses 224, e.g., social media posts having different properties, different sign in pages for a website, etc.

Instead of the machine readable instructions 112-126, the apparatus 100 may include hardware logic blocks that may perform functions similar to the instructions 112-126. In other examples, the apparatus 100 may include a combination of instructions and hardware logic blocks to implement or execute functions corresponding to the instructions 112-126. In any of these examples, the processor 102 may implement the hardware logic blocks and/or execute the instructions 112-126. As discussed herein, the apparatus 100 may also include additional instructions and/or hardware logic blocks such that the processor 102 may execute operations in addition to or in place of those discussed above with respect to FIG. 1.

Figure 3:
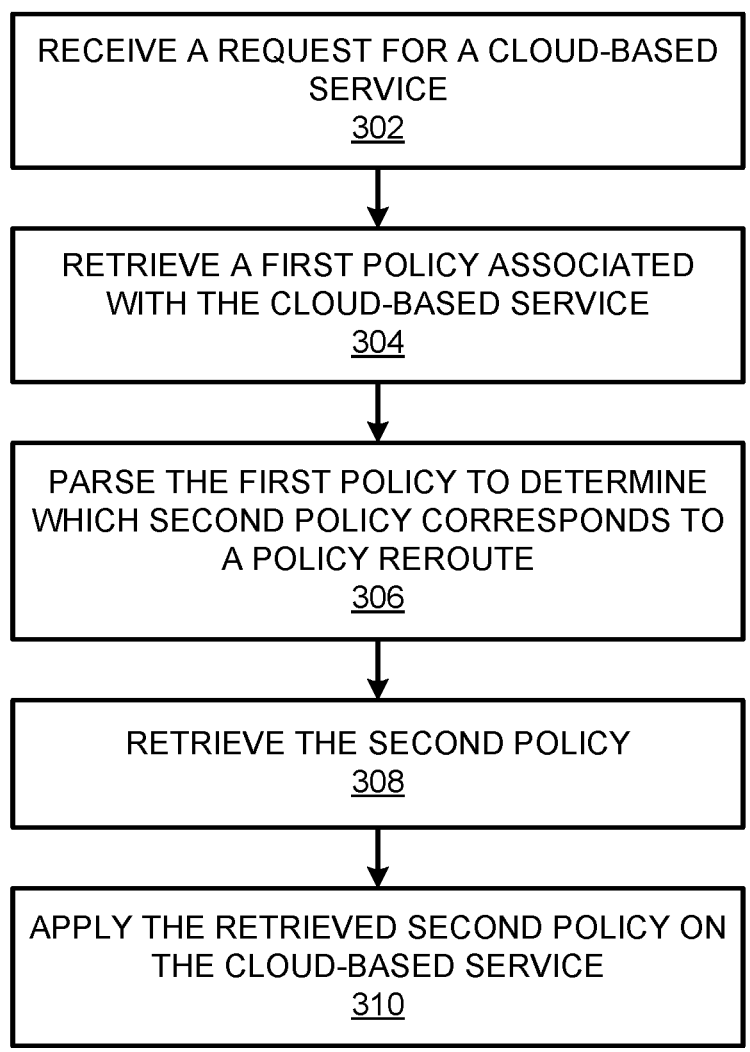
FIG. 3 depicts a block diagram of a method for applying a policy reroute on a cloud-based service in accordance with an embodiment of the present disclosure.

Various manners in which the processor 102 of the apparatus 100 may operate are discussed in greater detail with respect to the method 300 depicted in FIG. 3. Particularly, FIG. 3 depicts a flow diagram of a method 300 for applying a policy reroute on a cloud-based service 214 in accordance with an embodiment of the present disclosure. It should be understood that the method 300 depicted in FIG. 3 may include additional operations and that some of the operations described therein may be removed and/or modified without departing from the scope of the method 300. The description of the method 300 is made with reference to the features depicted in FIGS. 1-2 for purposes of illustration.

At block 302, the processor 102 may receive a request 222 for a cloud-based service 214. The processor 102 may receive the request 222 from a user 220 via a network 240.

At block 304, the processor 102 may, based on receipt of the request 222, retrieve a first policy 106 associated with the cloud-based service 214 from a data store 104. At block 306, the processor 102 may parse the first policy 106 to determine which second policy 108-1 of a plurality of second policies corresponds to a policy reroute of the first policy 106. At block 308, the processor 102 may retrieve the second policy 108-1 that corresponds to the policy reroute from the data store 108. In addition, at block 310, the processor 102 may apply the retrieved second policy 108-1 on the cloud-based service 214. In some examples, application of the retrieved second policy 108-1 on the cloud-based service 314 may cause the cloud-based service 314 to provide, e.g., display, output, etc., a response 224 to the user 220.

The processor 102 may repeat blocks 302-310 for each of a number of requests 222 for the cloud-based service 214, in which different responses 224 may be outputted to users 220. For instance, the first policy 106 may identify different policy reroutes for some of the requests 222 as discussed herein, which may result in different responses 224 being outputted to the users 220. In addition, the first policy 106 may be used for all external facing interfaces such as tokens and metadata. Moreover, although the first policy 106 may reroute to a second policy 108-1, from the user's 220 perspective, the reroute may be transparent. That is, the user 220 may only be aware of the first policy 106 and all of the entities associated with the user 220 that make a reference to the first policy 106 (such as tokens/metadata endpoint, etc.) may also reference the first policy 106, in spite of the reroute to the second policy 108-1.

In some examples, the first policy 106 and the rerouted policy, e.g., the second policy 108-1 corresponding to an identified policy reroute, may be stored in a map in a cookie. This may ensure for subsequent legs of the user 220 call request 222, the first policy 106 may be rerouted to the same second policy.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 4:
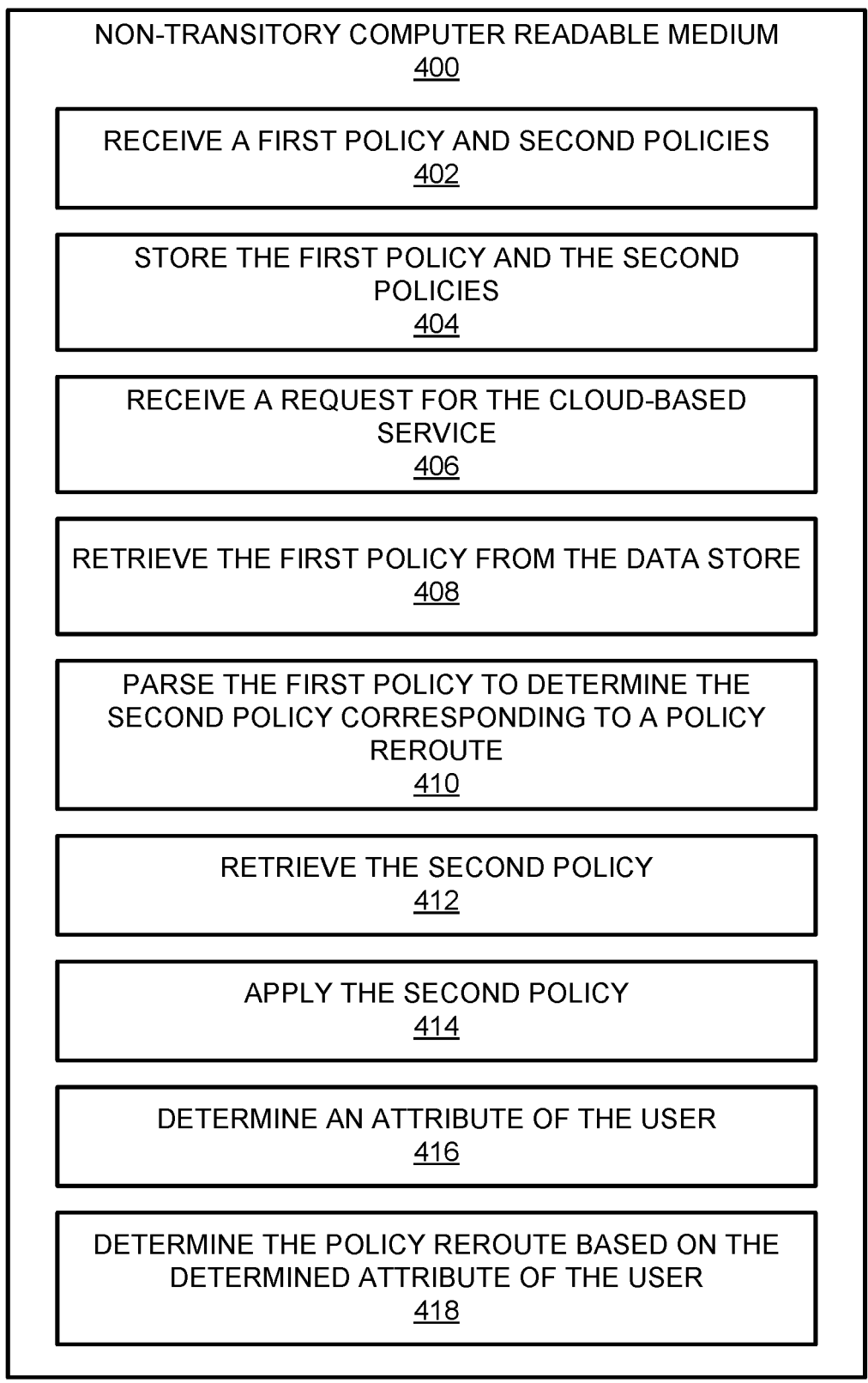
FIG. 4 depicts a non-transitory computer readable medium that may have stored thereon machine readable instructions that when executed by a processor, may cause the processor to determine a policy reroute of a first policy to be applied on a cloud-based service in accordance with an embodiment of the present disclosure.

Turning now to FIG. 4, there is shown a block diagram of a non-transitory computer readable medium 400 that may have stored thereon machine readable instructions that when executed by a processor, may cause the processor to determine a policy reroute of a first policy 106 to be applied on a cloud-based service 214 according to an embodiment of the present disclosure. It should be understood that the non-transitory computer readable medium 400 depicted in FIG. 4 may include additional instructions and that some of the instructions described herein may be removed and/or modified without departing from the scope of the non-transitory computer readable medium 400 disclosed herein.

The non-transitory computer readable medium 400 may have stored thereon machine readable instructions 402-418 that a processor, such as the processor 102 depicted in FIGS. 1 and 2, may execute. The non-transitory computer readable medium 400 may be an electronic, magnetic, optical, or other physical storage device that contains or stores executable instructions. The—transitory computer readable medium 400 may be, for example, Random Access memory (RAM), an Electrically Erasable Programmable Read-Only Memory (EEPROM), a storage device, an optical disc, and the like. The term "non-transitory" does not encompass transitory propagating signals.

The processor may fetch, decode, and execute the instructions 402 to receive a first policy 106 and a plurality of second policies 108-1 to 108-N of a cloud-based service 214. The processor may fetch, decode, and execute the instructions 404 to store the first policy 1066 and the plurality of second policies 108-1 to 108-N in a data store 104. The processor may fetch, decode, and execute the instructions 406 to receive a request for the cloud-based service 214, for instance, from a user 220. The processor may fetch, decode, and execute the instructions 408 to, based on receipt of the request, retrieve the first policy 106 from the data store 104. The processor may fetch, decode, and execute the instructions 410 to parse the first policy 106 to determine which second policy of the plurality of second policies 108-1 to 108-N corresponds to a policy reroute of the first policy 106. The processor may fetch, decode, and execute the instructions 412 to retrieve the second policy 108-1 that corresponds to the determined policy reroute from the data store 104. In addition, the processor may fetch, decode, and execute the instructions 414 to apply the retrieved second policy 108-1 on the cloud-based service 214. Application of the retrieved second policy 108-1 on the cloud-based service 214 may result in a response 224 being outputted or delivered to the user 220.

In some examples, the processor may fetch, decode, and execute the instructions 416 to determine an attribute of the user 220. In addition, the processor may fetch, decode, and execute the instructions 418 to determine the policy reroute from candidate policy reroutes based on the determined attribute of the user. The processor may apply the retrieved second policy 108-1 to cause a selected version of the cloud-based service 214 corresponding to the retrieved second policy 108-1 to be executed. In addition or alternatively, the processor may apply the retrieved second policy 108-1 to cause the cloud-based service 214 to be executed according to a selected execution plan corresponding to the retrieved second policy 108-1.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
   a processor; and
   a memory on which is stored machine readable instructions that are executable to cause the processor to:
   receive a call request for a cloud-based service from a user;
   based on the received call request, retrieve and execute a first policy corresponding to the cloud-based service, wherein the first policy is a first configuration file that, when executed, provides the cloud-based service, wherein the first policy includes a list of a plurality of second policies that are identified as candidate policy reroutes for rerouting the call request after the execution of the first policy, wherein the plurality of second policies are second configuration files that provide different variations of a webpage provided by the cloud-based service based on conditions of the user;
   determine a geographical location of the user as one of the conditions of the user;
   based on the geographical location of the user, select a particular second policy of the plurality of second policies as a policy reroute to reroute the call request after the execution of the first policy;

retrieve the particular second policy;

apply the particular second policy on the cloud-based service to provide a particular variation of the webpage provided by the cloud-based service as a result of the geographical location of the user; and provide the cloud-based service as a response to the call request following the application of the particular second policy, with the particular variation of the webpage provided by the cloud-based service.

2. The apparatus of claim 1, wherein the instructions are further executable to cause the processor to:

receive the first configuration file of the first policy and the second configuration files of the plurality of second policies from a tenant of the cloud-based service; and store the first configuration file and the second configuration files in a data store.

3. The apparatus of claim 1, wherein the instructions are further executable to cause the processor to:

determine an attribute of the user; and select the particular second policy as the policy reroute from the candidate policy reroutes based on the attribute of the user and the geographical location of the user.

4. The apparatus of claim 1, wherein the instructions are further executable to cause the processor to:

in addition to the particular second policy, arbitrarily select another one of the candidate policy reroutes as the policy reroute of the first policy.

5. The apparatus of claim 1, wherein the articular variation of the webpage comprises a background color, a popup display, or a sign-in page.

6. The apparatus of claim 1, wherein each of the plurality of second policies corresponds to one of a plurality of execution plans for the cloud-based service.

7. The apparatus of claim 1, wherein the first policy identifies the candidate policy reroutes based on a universal resource locator included in the call request.

8. A method comprising:

receiving, by a processor, a request for a cloud-based service from a user;

based on receipt of the request, retrieving and executing, by the processor, a first policy associated with the cloud-based service from a data store, wherein the first policy is a first configuration file that, when executed, provides the cloud-based service, wherein the first policy includes a list of a plurality of second policies that are identified as candidate policy reroutes for rerouting the request after the execution of the first policy, wherein the plurality of second policies are second configuration files that provide different variations of a webpage provided by the cloud-based service based on conditions of the user;

determining, by the processor, a geographical location of the user as one of the conditions of the user;

based on the geographical location of the user, selecting, by the processor, a particular second policy of the plurality of second policies as a policy reroute to reroute the request after the execution of the first policy;

retrieving, by the processor, the particular second policy from the data store;

applying, by the processor, the particular second policy on the cloud-based service to provide a particular variation of the webpage provided by the cloud-based service as a result of the geographical location of the user; and providing, by the processor, the cloud-based service as a response to the received request following the application of the particular second policy, with the particular variation of the webpage provided by the cloud-based service.

9. The method of claim 8, further comprising:

receiving, by the processor, the first configuration file of the first policy and the second configuration files of the plurality of second policies; and storing, by the processor, the first configuration file and the second configuration files in the data store.

10. The method of claim 8, the method further comprising:

determining an attribute of the user; and selecting the particular second policy as the policy reroute from the candidate policy reroutes based on the attribute of the user and the geographical location of the user.

11. The method of claim 8, the method further comprising:

in addition to the particular second policy, selecting another one of the candidate policy reroutes as the policy reroute of the first policy.

12. The method of claim 8, wherein applying the particular second policy comprises:

applying the particular second policy to cause a version of the cloud-based service corresponding to the particular second policy to be executed.

13. The method of claim 8, wherein the particular variation of the webpage comprises a background color, a popup display, or a sign-in page.

14. The method of claim 8, wherein each of the plurality of second policies corresponds to one of a plurality of execution plans for the cloud-based service, and wherein applying the particular second policy comprises:

applying the particular second policy to cause the cloud-based service to be executed according to the execution plan corresponding to the particular second policy.

15. A non-transitory computer readable medium on which is stored machine readable instructions that, when executed by a processor, cause the processor to:

receive a request for a cloud-based service from a user;

based on receipt of the request, retrieve a first policy from a data store and execute the first policy, wherein the first policy is a first configuration file that, when executed, provides the cloud-based service, wherein the first policy includes a list of a plurality of second policies that are identified as candidate policy reroutes for rerouting the request after the execution of the first policy, and wherein the plurality of second policies are second configuration files that provide different variations of a webpage provided by the cloud-based service based on conditions of the user;

determine a geographical location of the user as one of the conditions of the user;

based on the geographical location of the user, select a particular second policy of the plurality of second policies as a policy reroute to reroute the request after the execution of the first policy;

retrieve the particular second policy from the data store;

apply the particular second policy on the cloud-based service to provide a particular variation of the webpage provided by the cloud-based service as a result of the geographical location of the user; and provide the cloud-based service as a response to the received request following the application of the particular second policy, with the particular variation of the webpage provided by the cloud-based service.

16. The non-transitory computer readable medium of claim 15, wherein the instructions are further executable to cause the processor to:
   determine an attribute of the user; and
   select the particular second policy as the policy reroute from the candidate policy reroutes based on the attribute of the user and the geographical location of the user.

17. The non-transitory computer readable medium of claim 15, wherein, to apply the particular second policy, the instructions are further executable to cause the processor to:
   apply the particular second policy to cause a version of the cloud-based service corresponding to the particular second policy to be executed.

18. The non-transitory computer readable medium of claim 15, wherein each of the plurality of second policies corresponds to one of a plurality of execution plans for the cloud-based service, and wherein to apply the particular second policy, the instructions are further executable to cause the processor to:
   apply the particular second policy to cause the cloud-based service to be executed according to the execution plan corresponding to the particular second policy.

* * * * *